US012243107B2

(12) United States Patent
Banks et al.

(10) Patent No.: US 12,243,107 B2
(45) Date of Patent: *Mar. 4, 2025

(54) USAGE ESTIMATION SYSTEMS AND METHODS FOR RISK ASSOCIATION ADJUSTMENTS

(71) Applicant: HARTFORD FIRE INSURANCE COMPANY, Hartford, CT (US)

(72) Inventors: Brandon A. Banks, West Hartford, CT (US); Kenneth J. Zygiel, Harwinton, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,014

(22) Filed: Sep. 19, 2023

(65) Prior Publication Data

US 2024/0005412 A1 Jan. 4, 2024

Related U.S. Application Data

(63) Continuation of application No. 17/066,803, filed on Oct. 9, 2020, now Pat. No. 11,798,093.

(51) Int. Cl.
| | |
|---|---|
| *G06Q 40/08* | (2012.01) |
| *G06N 5/04* | (2023.01) |
| *G06N 20/00* | (2019.01) |
| *G16Y 40/10* | (2020.01) |

(52) U.S. Cl.
CPC .............. *G06Q 40/08* (2013.01); *G06N 5/04* (2013.01); *G06N 20/00* (2019.01); *G16Y 40/10* (2020.01)

(58) Field of Classification Search
CPC .......... G06Q 40/08; G06N 20/00; G06N 5/04; G16Y 40/10
See application file for complete search history.

(56) References Cited

U.S. PATENT DOCUMENTS

| | | | |
|---|---|---|---|
| 2013/0096954 A1* | 4/2013 | Bodas | G06Q 40/08 705/4 |
| 2019/0311443 A1* | 10/2019 | Blades | H04L 9/3239 |
| 2021/0192630 A1* | 6/2021 | Hakimi-Boushehri | G01D 4/004 |
| 2022/0036466 A1* | 2/2022 | Harvey | H04L 67/306 |

* cited by examiner

*Primary Examiner* — Scott S Trotter
(74) *Attorney, Agent, or Firm* — Buckley, Maschoff & Talwalkar LLC

(57) ABSTRACT

According to some embodiments, a risk relationship data store may contain electronic records, each electronic record representing a risk relationship between an enterprise and a risk relationship provider (e.g., an insurer), and including, for each risk relationship, an electronic record identifier and a set of estimated usage attribute values. A back-end application computer server may receive, from a current usage data source, current usage information for the enterprise (e.g., financial information, utility information, IoT information, etc.). Based on the current usage information, the computer server may infer a likely actual current usage for the enterprise. The computer server may then compare the likely actual current usage with the predicted usage attribute value to determine a risk difference result and adjust a risk relationship parameter based on the risk difference result.

20 Claims, 19 Drawing Sheets

USAGE ESTIMATION SYSTEMS AND METHODS FOR RISK ASSOCIATION ADJUSTMENTS

CROSS-REFERENCE TO RELATED APPLICATION

The present application is a continuation of U.S. Pat. No. 11,798,093, entitled "USAGE ESTIMATION SYSTEM AND METHODS FOR RISK ASSOCIATION ADJUSTMENTS" and filed Oct. 9, 2020. The entire content of that application is incorporated herein by reference.

TECHNICAL FIELD

The present application generally relates to computer systems and more particularly to computer systems that are adapted to accurately and/or automatically estimate and/or measure usage information for an enterprise.

BACKGROUND

An enterprise may enter into a risk relationship with a risk relationship provider (e.g., an insurer) to protect itself from damages associated with unexpected occurrences. For example, the risk relationship may provide payments associated with unforeseen accidents, weather events, work stoppages, etc. Several factors may influence the amount of risk associated with a particular type of risk, such as the size of a building, an amount of product that is manufactured or sold, etc. To help determine this information, an insurer might ask a business "how much product will you sell next year?" and the business might reply "10 million dollars of product," "1,000 units," etc. This information may then be used to calculate attributes of an insurance policy (e.g., premium values, exclusions and risk classifications, etc.). In other cases, an insurer might look at previous data associated with the business and assume that next year's numbers will be similar or follow a predicable trend. Such an approach, however, can be a time consuming and unreliable process. For example, an unexpected national or global slowdown might cause the amount of product manufactured and/or sold to suddenly fall.

It would be desirable to provide systems and methods to automatically estimate and/or measure usage information in a way that provides fast and accurate results. Moreover, the estimated and measured usage information should be easy to access, understand, update, etc.

SUMMARY OF THE INVENTION

According to some embodiments, systems, methods, apparatus, computer program code and means are provided to automatically estimate and/or measure usage information in a way that provides fast and accurate results and that allows for flexibility and effectiveness when responding to those results.

In some embodiments, a risk relationship data store contains electronic records, each electronic record representing a risk relationship between an enterprise and a risk relationship provider (e.g., an insurer), and including, for each risk relationship, an electronic record identifier and a set of estimated usage attribute values. A back-end application computer server may receive, from a current usage data source, current usage information for the enterprise (e.g., financial information, utility information, IoT information, etc.). Based on the current usage information, the computer server may infer a likely actual current usage for the enterprise. The computer server may then compare the likely actual current usage with the predicted usage attribute value to determine a risk difference result and adjust a risk relationship parameter based on the risk difference result.

Some embodiments comprise: means for accessing, by a back-end application computer server, a risk relationship data store that contains electronic records, each electronic record representing a risk relationship between an enterprise and a risk relationship provider, and including, for each risk relationship, an electronic record identifier and a predicted usage attribute value; means for receiving, from a current usage data source, current usage information for the enterprise; based on the current usage information, means for inferring a likely actual current usage for the enterprise; means for comparing the likely actual current usage with the predicted usage attribute value to determine a risk difference result; means for adjusting a risk relationship parameter based on the risk difference result; and means for arranging to provide an interactive display, including an indication of the adjusted risk relationship parameter, via a distributed communication network.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to automatically predict and/or measure usage in a way that provides fast and accurate results. With these and other advantages and features that will become hereinafter apparent, a more complete understanding of the nature of the invention can be obtained by referring to the following detailed description and to the drawings appended hereto.

DETAILED DESCRIPTION

Figure 1:
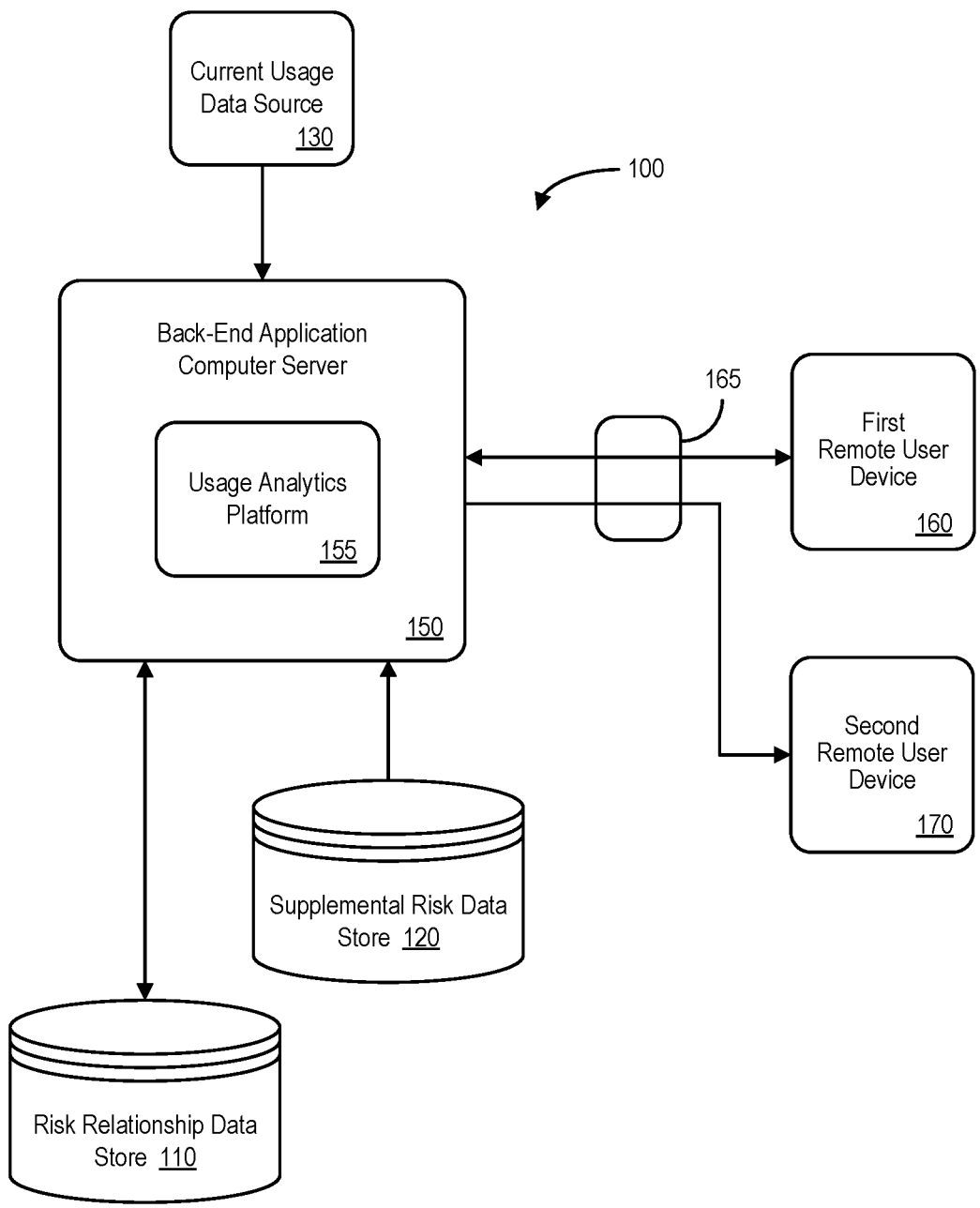
FIG. 1 is a high-level block diagram of an estimated usage data collection system in accordance with some embodiments.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data analytics associated with usage information. The present invention is directed to more than merely a computer implementation of a routine or conventional activity previously known in the industry as it provides a specific advancement in the area of electronic record analysis by providing improvements in data leveraging to identify estimated usage risk factors and to predict and/or measure actual usage. The present invention provides improvement beyond a mere generic computer implementation as it involves the novel ordered combination of system elements and processes to provide improvements in data leveraging to identify estimated usage risk factors, predict usage, measure usage, etc. Some embodiments of the present invention are directed to a system adapted to automatically analyze insurance data, aggregate data from multiple sources, automatically identify estimated usage risk drivers, automatically identify how these estimated usage risk drivers affect insurance claim outcomes, and/or automatically provide estimated usage predictions and measurements. Moreover, communication links and messages may be automatically established, aggregated, formatted, etc. to improve network performance based on usage levels (e.g., to assign additional resources to an unexpectedly busy business).

According to some embodiments, a connected business owner's insurance policy may adjust or conform to periods of business expansion or contraction. A data model and actuarial method may be provided to analyze exposure data in real-time and apply the factors to variable components of the insurance policy continuously (with user authorization) throughout the policy period. Application Programming Interfaces ("APIs") between a carrier and financial management software provider, utility company, IoT sensor manufacturer, etc. may feed the adjusted exposure algorithm to determine variance from an exposure base. Material exposure changes may then be detected to automate a submission of appropriate usage-based insurance policy endorsements such rating changes, limits changes, classification or coverage changes, etc.

FIG. 1 is a high-level block diagram of a system 100 according to some embodiments of the present invention. In particular, the system 100 includes a back-end application computer server 150 that may access information in a risk relationship data store 110 (e.g., storing a set of electronic records that represent existing risk associations, each record including, for example, one or more risk relationship identifiers, a predicted attribute variable, resource values, etc.). The back-end application computer server 150 may also retrieve information from other data stores or sources, such as a supplemental risk data store 120, in connection with a usage analytics platform 155 to view, analyze, and/or update the electronic records. The back-end application computer server 150 may also exchange information with a first remote user device 160 and a second remote user device 170 (e.g., via a firewall 165). According to some embodiments, an interactive graphical user interface platform of the back-end application computer server 150 (and, in some cases, third-party data) may facilitate forecasts, decisions, predictions, and/or the display of results via one or more remote administrator computers (e.g., to gather additional information about an existing risk relationship) and/or the remote user devices 160, 170. For example, the first remote user device 160 may transmit annotated and/or updated information to the back-end application computer server 150. Based on the updated information, the back-end application computer server 150 may adjust data in the risk relationship data store 110 and the change may be viewable via the second remote user device 170. Note that the back-end application computer server 150 and/or any of the other devices and methods described herein might be associated with a third-party, such as a vendor that performs a service for an enterprise. As will be described, the back-end application computer server 150 may receive information from a current usage data source 130 (e.g., associated with financial data, public utility data, IoT data, etc.) and use that information to adjust insurance policies as appropriate.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate the automated access and/or update of electronic records in the risk relationship data store 110. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the risk relationship data store 110 and/or supplemental risk data store 120 (e.g., associated with a different entity or company as compared to the risk relationship data store 110). The data stores 110, 120 may be locally stored or reside remote from the back-end application computer server 150. As will be described further below, the risk relationship data store 110 may be used by the back-end application computer server 150 in connection with an interactive user interface to access and update electronic records. Although a single back-end application computer server 150 is shown in FIG. 1, any number of such devices may be included. Moreover, various devices described herein might be combined according to embodiments of the present invention. For example, in some embodiments, the back-end application computer server 150 and risk relationship data store 110 might be co-located and/or may comprise a single apparatus.

Figure 2:
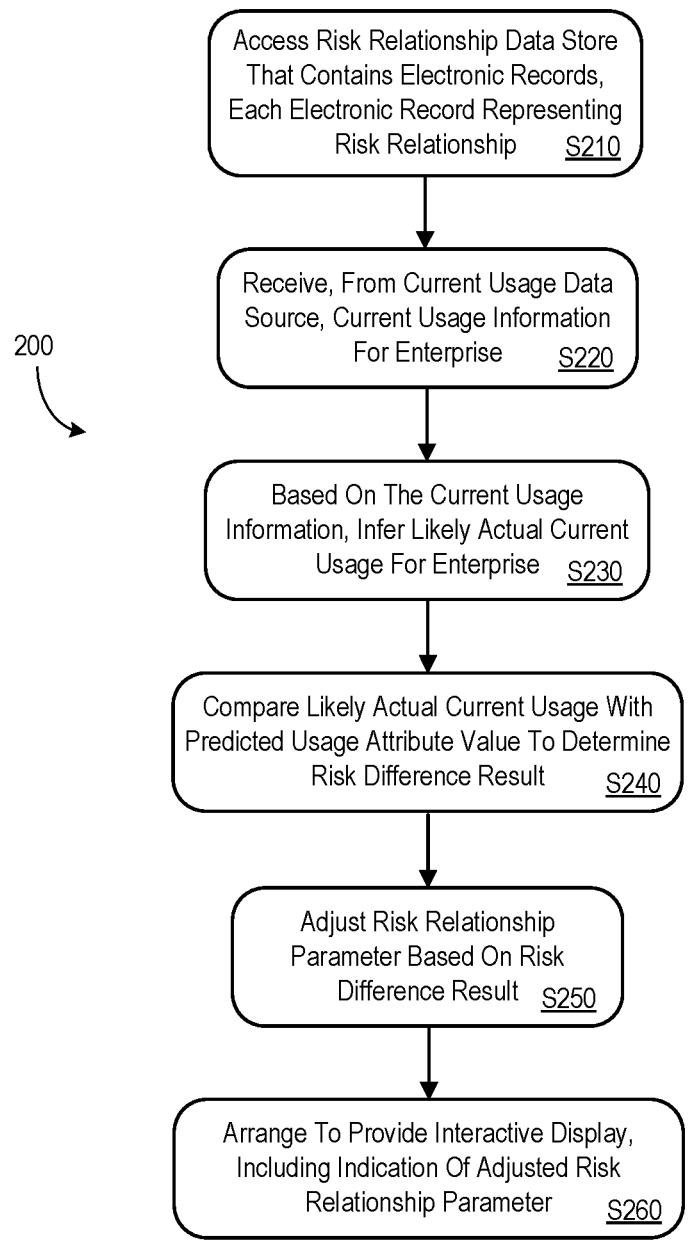
FIG. 2 illustrates an estimated usage method according to some embodiments of the present invention.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a back-end application computer server may access a risk relationship data store that contains electronic records, each electronic record representing a risk relationship between an enterprise and a risk relationship provider, and including, for each risk relationship, an electronic record identifier and a predicted usage attribute value. The predicted usage attribute value might represent, for example, an amount of raw materials that has been purchased or processed by a business. Similarly, the predicted usage attribute value might represent an amount of product or services created by a business (e.g., one thousand gallons of water might equal a fixed number of lemonade bottles). At S220, the system may receive, from a current usage data source, current usage information for the enterprise (e.g., associated with financial data, public utility data, IoT data, etc.). Based on the current usage information, the system may infer a likely actual current usage for the enterprise at S230. For example, if the enterprise is a soda distributor, an amount of water that has been consumed by a manufacturing plant might be used to infer a number of bottles of soda that have been created by the enterprise. At S240, the system may compare the likely actual current usage with the predicted usage attribute value to determine a risk difference result (e.g., is the enterprise using much more—or less—of a material and is therefore perhaps associated with greater—or reduced—level of risk?). At S250, a risk relationship parameter (e.g., an insurance premium or deductible) may be automatically adjusted based on the risk difference result. In some cases, a human manager might "review" the adjustment before it is implemented (e.g., to make sure that the proposed change "makes sense"). At S260, the system may arrange to provide an interactive display, including an indication of the adjusted risk relationship parameter, via a distributed communication network. Embodiments that utilize usage information (including, for example, an amount of raw materials that has been purchased or processed) to assess risk may be particularly helpful with respect to manufacturing, business, and/or liability risks.

Figure 3:
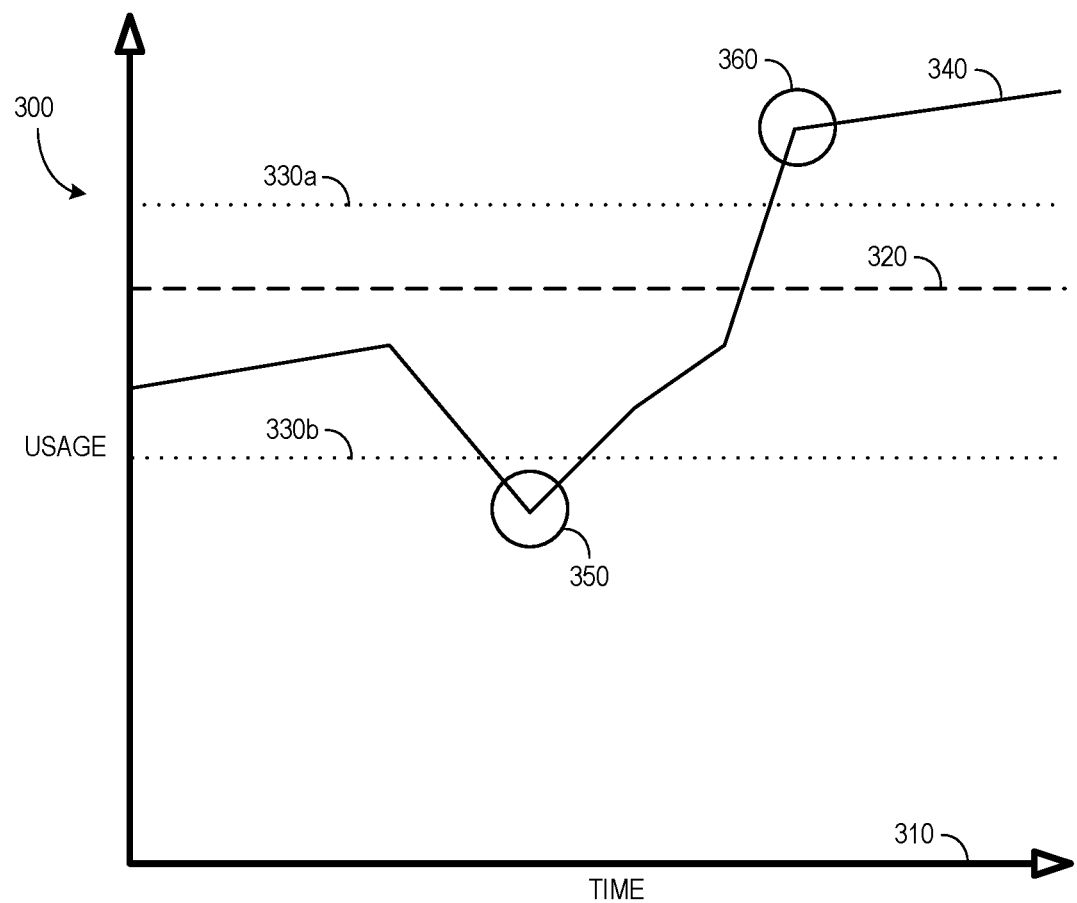
FIG. 3 shows predicted and actual usage over time in accordance with some embodiments.

FIG. 3 shows 300 predicted and actual usage over time in accordance with some embodiments. In particular, a graph 310 shows a predicted level of usage 320 (illustrated by a dashed line in FIG. 3). The graph 310 might also show a maximum threshold value 330a and a minimum threshold value 330b (and typical business fluctuations may be expected to stay within those values 330a, 330b). The graph 310 further shows an actual current usage 340 (illustrated by a solid line in FIG. 3). As can be seen, the actual current usage 340 fell below the minimum threshold value 330b at point 350 (and an insurance premium might be automatically reduced) and rose above the maximum threshold value 330a at point 360 (and the insurance premium might be automatically increased).

Figure 4:
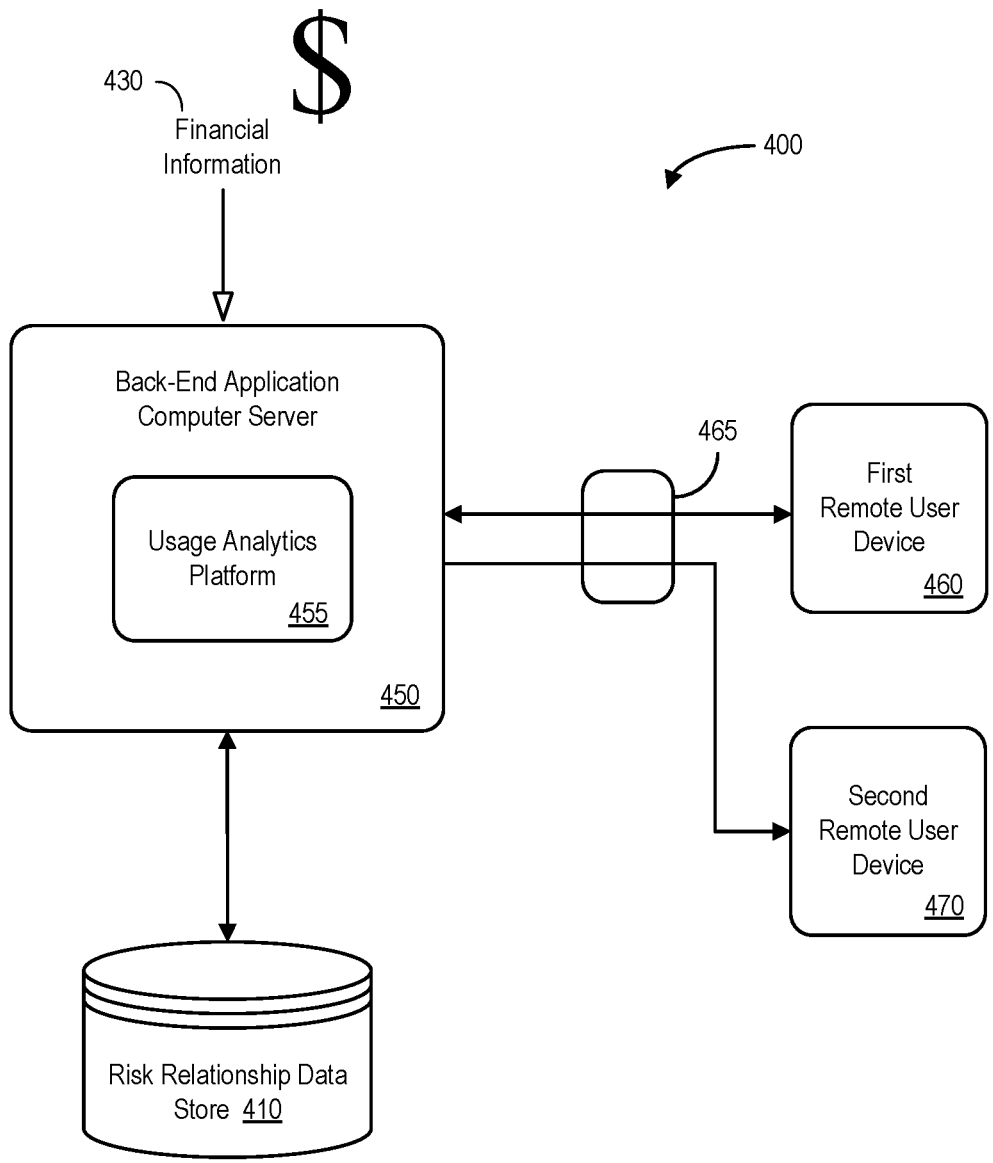
FIG. 4 is a block diagram of a system including financial information in accordance with some embodiments.

As used herein, the term "usage" may refer to any variable that affects a level of risk associated with an enterprise. For example, FIG. 4 is a block diagram of a system 400 including financial information in accordance with some embodiments. As before, a back-end application computer server 450 may utilize a usage analytics platform 455 to analyze information in a risk relationship data store 410. Moreover, the back-end application computer server 450 may exchange information (e.g., via a firewall 465) with multiple remote user devices 460, 470 (e.g., such as those associated with businesses, underwriters, etc.). According to some embodiments, the back-end application computer server 450 may also receive financial information 430 associated with one or more software packages, accounting programs, etc. The financial information 430 might be associated with, for example, sales, profits, a number of transactions, etc. The financial information 430 may then be analyzed by the usage analytics platform 455 and used to adjust an insurance parameter (e.g., if the estimated usage is much larger than expected, the level of risk may be higher than predicted).

Figure 5:
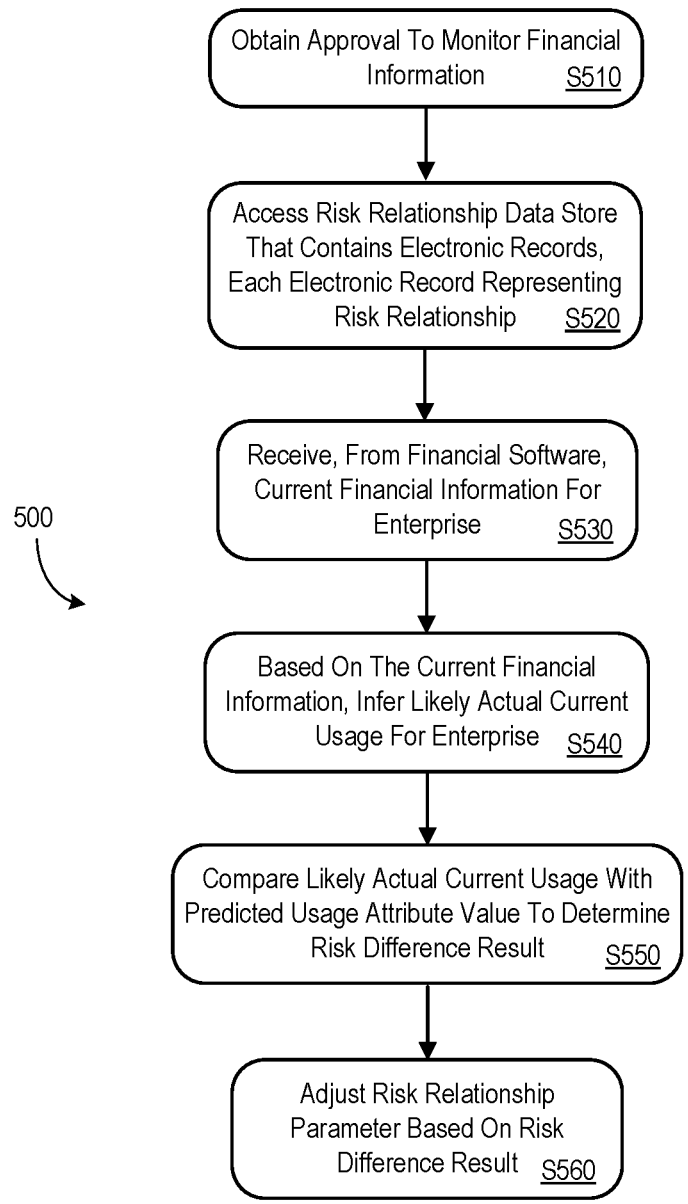
FIG. 5 is a method associated with financial information according to some embodiments.

FIG. 5 is a method 500 associated with financial information according to some embodiments. At S510, the system may obtain a business owner's approval to monitor financial information. At S520, a back-end application computer server may access a risk relationship data store that contains electronic records, each electronic record representing a risk relationship between an enterprise and a risk relationship provider, and including, for each risk relationship, an electronic record identifier and a predicted usage attribute value. At S530, the system may receive, from a current usage data source, current financial information ("usage" data) for the enterprise. The financial information might be associated with, for example, financial software, accounting software, tax management software, a Point of Sale ("PoS") system, and/or an order management system (e.g. that handles Purchase Orders ("POs")). According to some embodiments, the financial information might represent income, expenses, sales, profit, purchase orders, resources (e.g., raw resources consumed to manufacture a product), etc. In some cases, the financial data might be accessed via an API (e.g., such as an API associated with social media, a credit service, etc.). Based on the current usage information, the system may infer a likely actual current usage for the enterprise at S540. At S550, the system may compare the likely actual current usage with the predicted usage attribute value to determine a risk difference result. At S560, a risk relationship parameter (e.g., an insurance premium or deductible) may be automatically adjusted based on the risk difference result.

Figure 6:
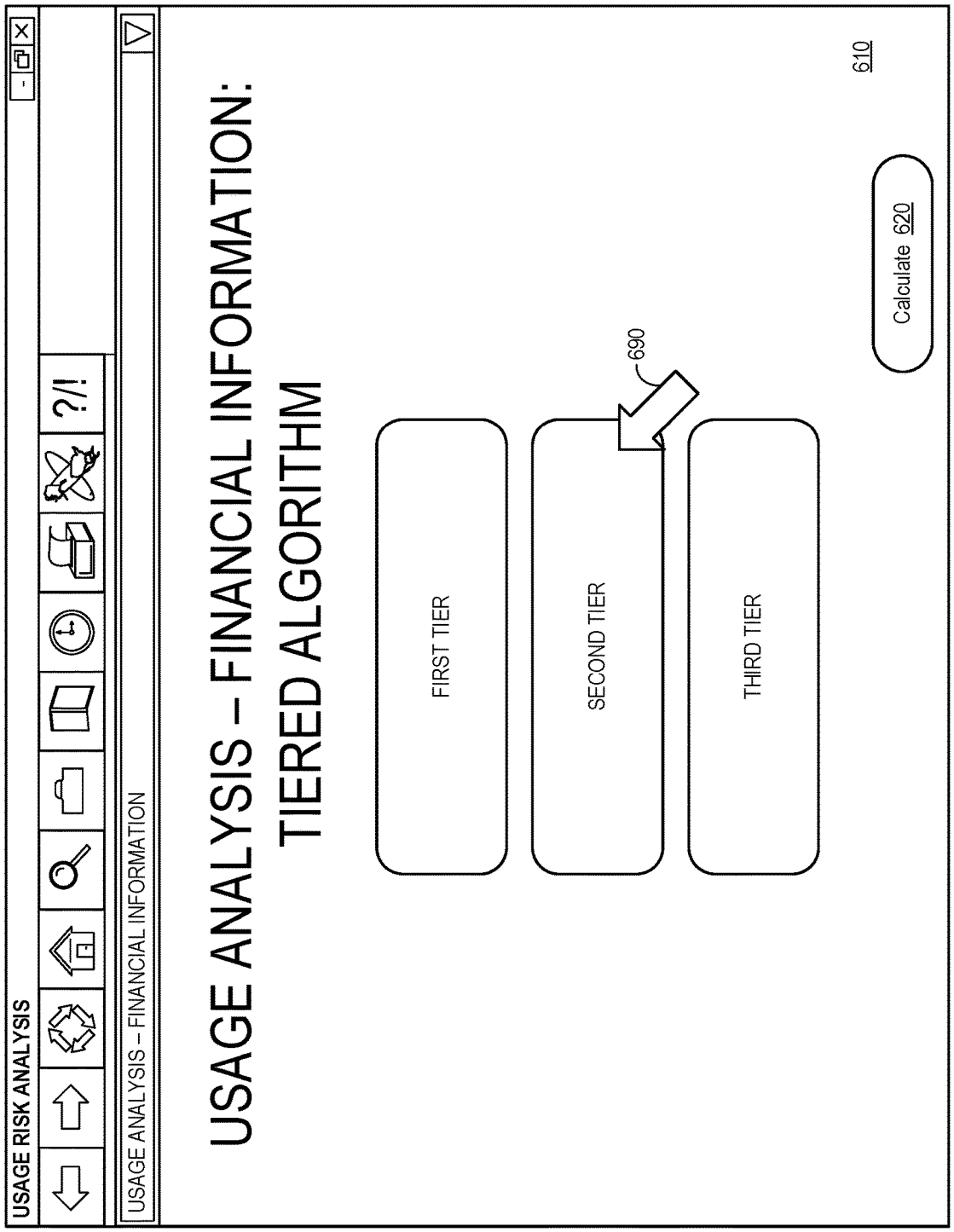
FIG. 6 is a tiered risk analysis display according to some embodiments.

Note that different risk parameters might be associated with different sensitivities to fluctuations. For example, a building square footage is unlikely to suddenly increase or decrease for an enterprise. In contrast, the types of products sold by a retail can be expected to rapidly change. FIG. 6 is a "tiered" risk analysis display 600 according to some embodiments. The display 600 includes a graphical representation 610 of a tiered algorithm to calculate risk. For example, a first tier may represent data elements that are expected to change, a third tier might represent data elements that are not expected to change, and a middle second tier might represent some combination of those two extremes. Selection of a portion or element of the display 600 might result in the presentation of additional information about that portion or element (e.g., selecting "first tier" in FIG. 6 might result in a popup window presenting data elements that are likely to change) and/or let an operator or administrator enter or annotate additional information about an estimated or predicted usage (e.g., based on his or her experience and expertise). Selection of a "Calculate" icon 620 (e.g., by touchscreen or computer mouse pointer 690) might cause the system or platform to re-analyze the usage information.

Figure 7:
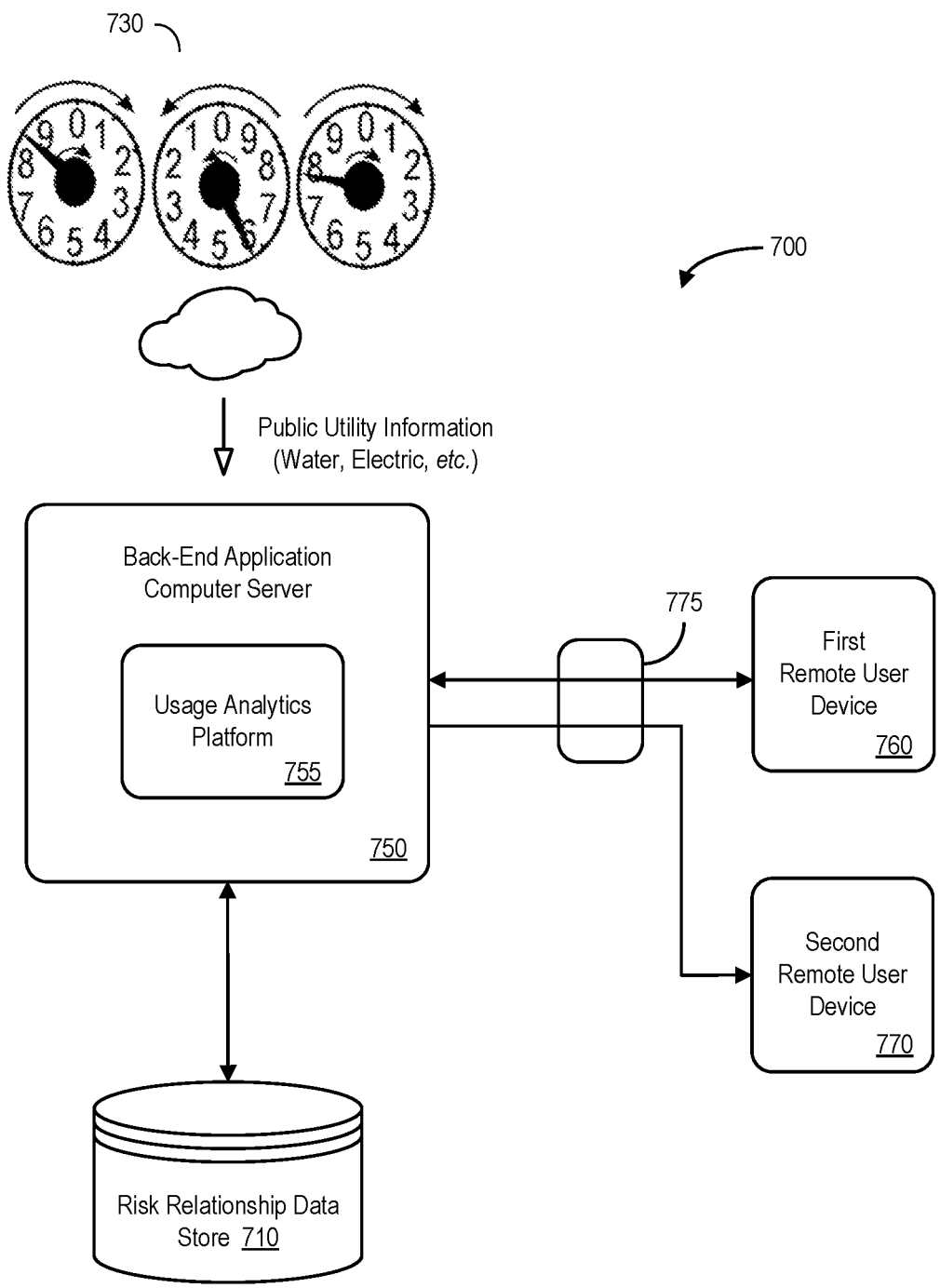
FIG. 7 is a block diagram of a system including public utility information in accordance with some embodiments.

FIG. 7 is a block diagram of a system 700 including public utility information in accordance with some embodiments. As before, a back-end application computer server 750 may utilize a usage analytics platform 755 to analyze information in a risk relationship data store 710. Moreover, the back-end application computer server 750 may exchange information (e.g., via a firewall 775) with multiple remote user devices 760, 770 (e.g., such as those associated with businesses, underwriters, business owners, etc.). According to this embodiment, the back-end application computer server 750 may also receive public utility information 730 (e.g., via a cloud-based application). The public utility information 730 might be associated with, for example, electronic files, images (e.g., of an invoice), handwritten notes, etc. and may be analyzed by the usage analytics platform 755 and used to determine an appropriate insurance adjustment. The system 700 may analyze the records 730 using, for example, Optical Character Recognition ("OCR"), Natural Language Processing ("NLP"), voice recognition, and similar technologies.

Figure 8:
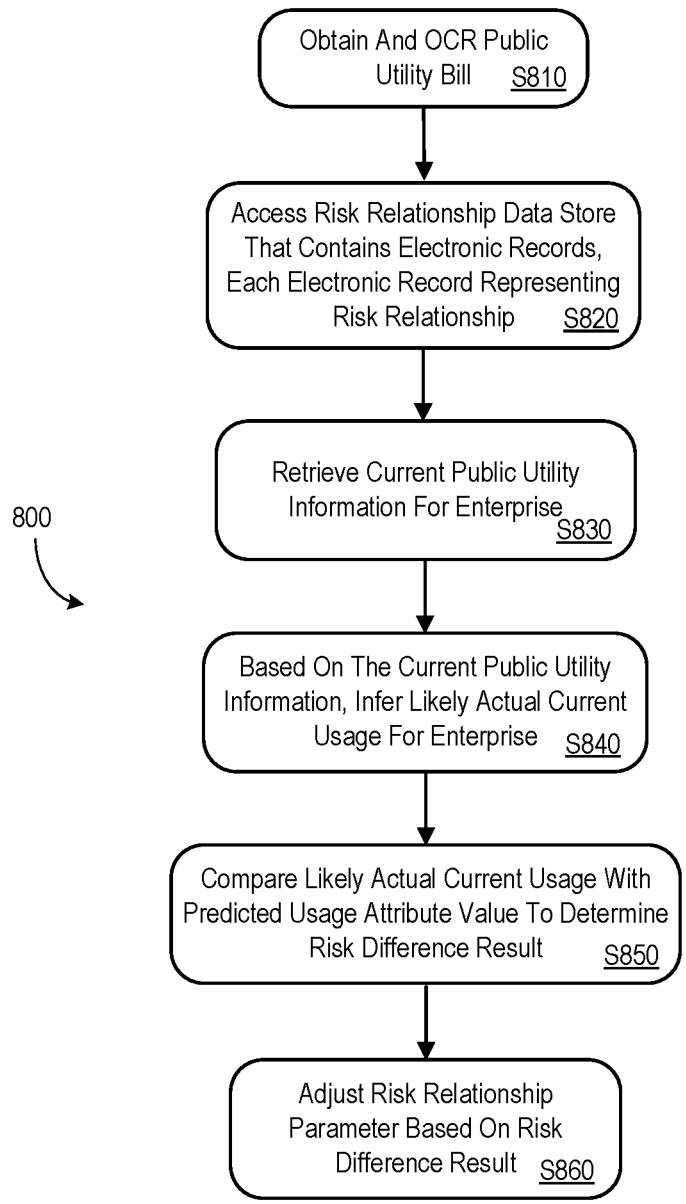
FIG. 8 is a public utility method according to some embodiments.

FIG. 8 is a public utility method 800 according to some embodiments. At S810, the system may obtain OCR a public utility bill. At S820, a back-end application computer server may access a risk relationship data store that contains electronic records, each electronic record representing a risk relationship between an enterprise and a risk relationship provider, and including, for each risk relationship, an electronic record identifier and a predicted usage attribute value. At S830, the system may receive, from a current usage data source, current public utility ("usage" data) for the enterprise. The public utility information might be associated with, for example, an electric utility, a water utility, a transportation service, a disposal service, etc. According to some embodiments, the public utility information might represent an amount of electric power or an amount of water. In some cases, the public utility data might be accessed via a physical sensor and/or a usage meter. Based on the current usage information, the system may infer a likely actual current usage for the enterprise at S840. At S850, the system may compare the likely actual current usage with the predicted usage attribute value to determine a risk difference result. At S860, a risk relationship parameter (e.g., an insurance premium or deductible) may be automatically adjusted based on the risk difference result.

Figure 9:
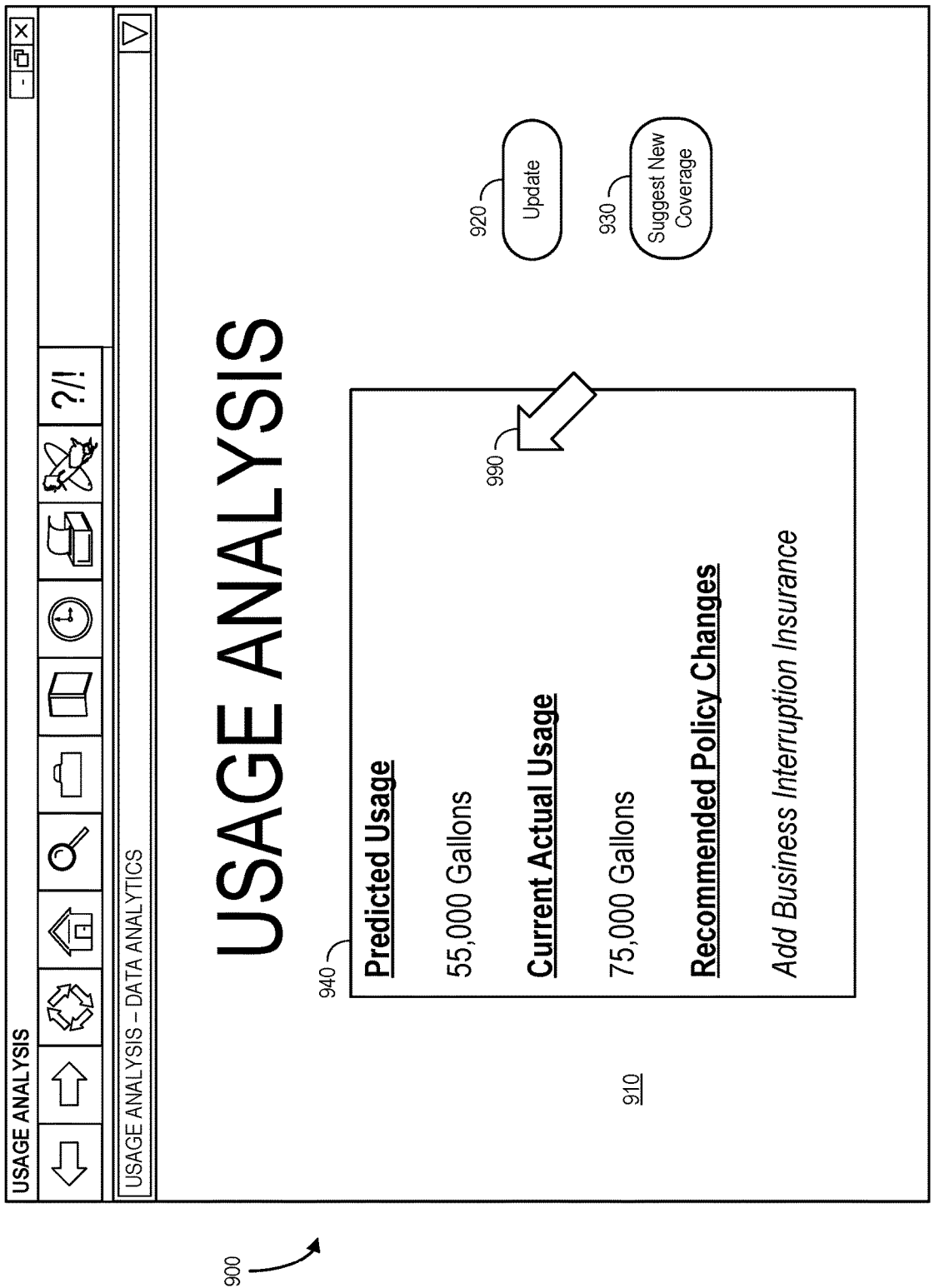
FIG. 9 is a reclassification or new coverage display in accordance with some embodiments.

In some cases, the adjustment to a risk relationship parameter might represent a re-classification of a business (e.g., a restaurant might be reclassified as a club, a new type of insurance (e.g., an "upsell opportunity"), etc. For example, FIG. 9 is a reclassification or new coverage display 900 in accordance with some embodiments. The display 900 includes a graphical representation 910 of a usage analysis. Selection of an "Update" icon 920 (e.g., by touchscreen or computer mouse pointer 990) might cause the system or platform to re-analyze the usage information. Selection of a "Suggest New Coverage" icon 930 may result in the display of contact information, automatically establish a communication link with a business device, etc. Selection of a portion or element of the display 900 might result in the presentation of additional information about that portion or element and/or let an operator or administrator enter or annotate additional information about an estimated or predicted usage (e.g., based on his or her experience and expertise).

Figure 10:
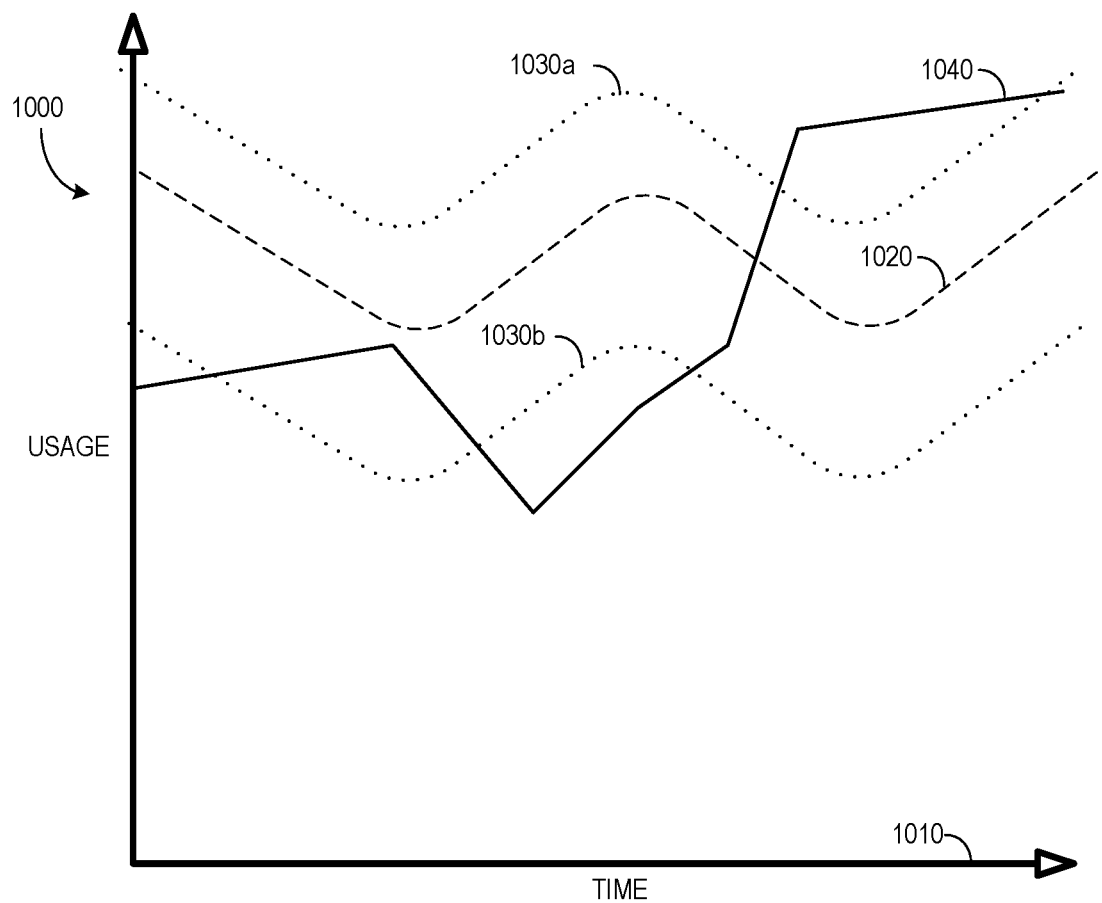
FIG. 10 is seasonal risk analysis illustration according to some embodiments.

Note that in some cases, an amount of business usage might be expected to naturally vary over time. For example, some businesses might not operate in the summer (or winter). FIG. 10 is seasonal risk analysis illustration 1000 according to some embodiments. In particular, a graph 1010 shows a predicted level of usage 1020 (illustrated by a dashed line in FIG. 10) that varies over time. The graph 1010 might also show a maximum threshold value 1030a and a minimum threshold value 1030b (and typical business fluctuations may be expected to stay within those values 1030a, 1030b). The graph 1010 further shows an actual current usage 1040 (illustrated by a solid line in FIG. 10). As can be seen, the actual current usage 1040 fell below the minimum threshold value 1030b at one point (and an insurance premium might be automatically reduced) and rose above the maximum threshold value 1030a at another point (and the insurance premium might be automatically increased).

Figure 11:
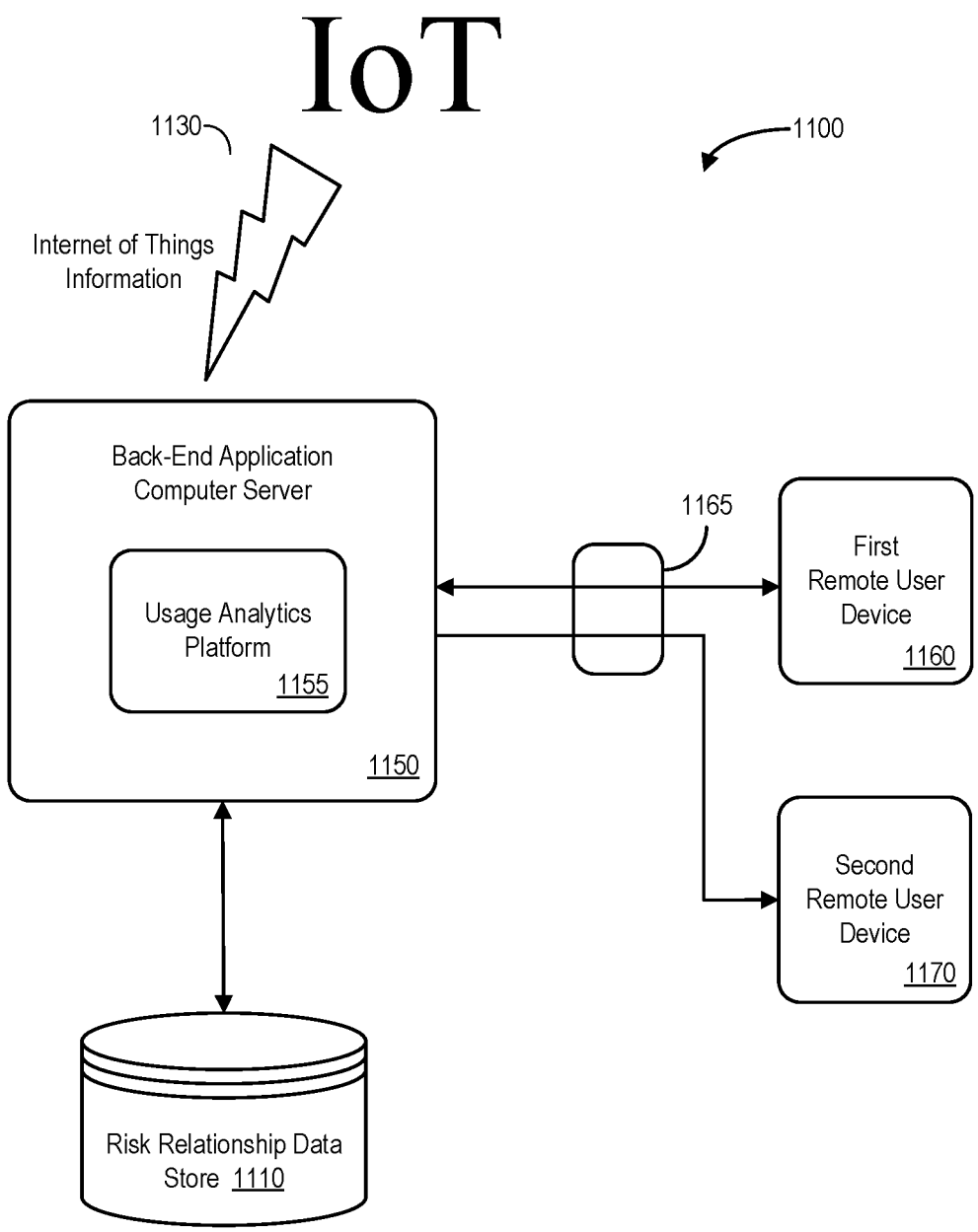
FIG. 11 is a block diagram of a system including IoT data in accordance with some embodiments.

FIG. 11 is a block diagram of a system 1100 including IoT data in accordance with some embodiments. As before, a back-end application computer server 1150 may utilize a usage analytics platform 1155 to analyze information in a risk relationship data store 1110. Moreover, the back-end application computer server 1150 may exchange information (e.g., via a firewall 1165) with multiple remote user devices 1160, 1170 (e.g., such as those associated with businesses, underwriters, etc.). According to this embodiment, the back-end application computer server 1150 may also receive IoT data 1130 (e.g., via wireless communications). In some embodiments, the IoT data 1130 might be collected by system 1100 to adjust insurance parameters as appropriate.

Figure 12:
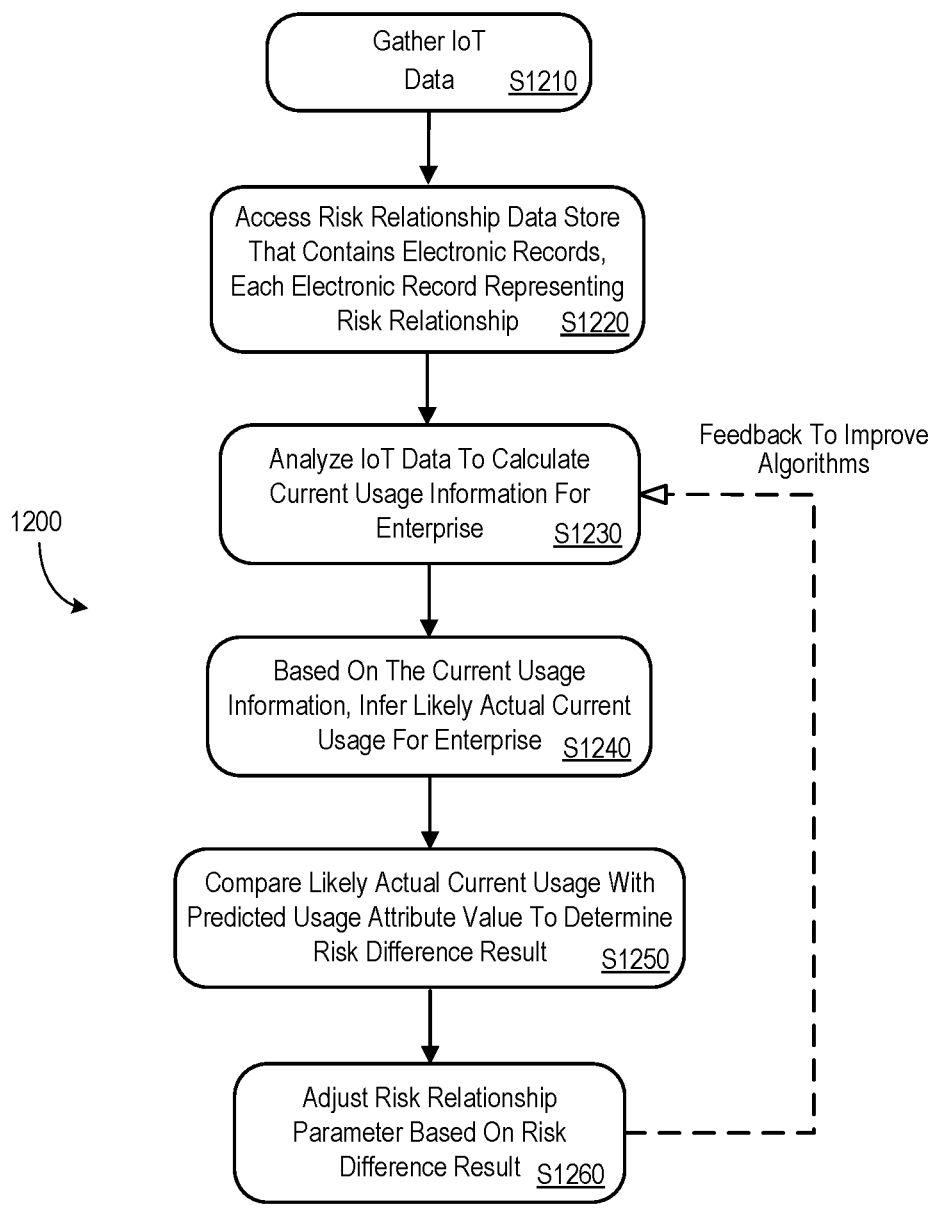
FIG. 12 is an IoT method according to some embodiment.

FIG. 12 is an IoT method 1200 according to some embodiment. At S1210, the system may obtain IoT data. The IoT data might be collected from, for example, occupancy sensors, proximity sensors, a smart security system, inventory tracking sensors, movement sensors, etc. At S1220, a back-end application computer server may access a risk relationship data store that contains electronic records, each electronic record representing a risk relationship between an enterprise and a risk relationship provider, and including, for each risk relationship, an electronic record identifier and a predicted usage attribute value. At S1230, the system may receive, from a current usage data source, current IoT data for the enterprise. Based on the IoT information, the system may infer a likely actual current usage for the enterprise at S1240. At S1250, the system may compare the likely actual current usage with the predicted usage attribute value to determine a risk difference result. At S1260, a risk relationship parameter (e.g., an insurance premium or deductible)

may be automatically adjusted based on the risk difference result. According to some embodiments, information about the adjustment may be provided as feedback to improve the algorithms.

Figure 13:
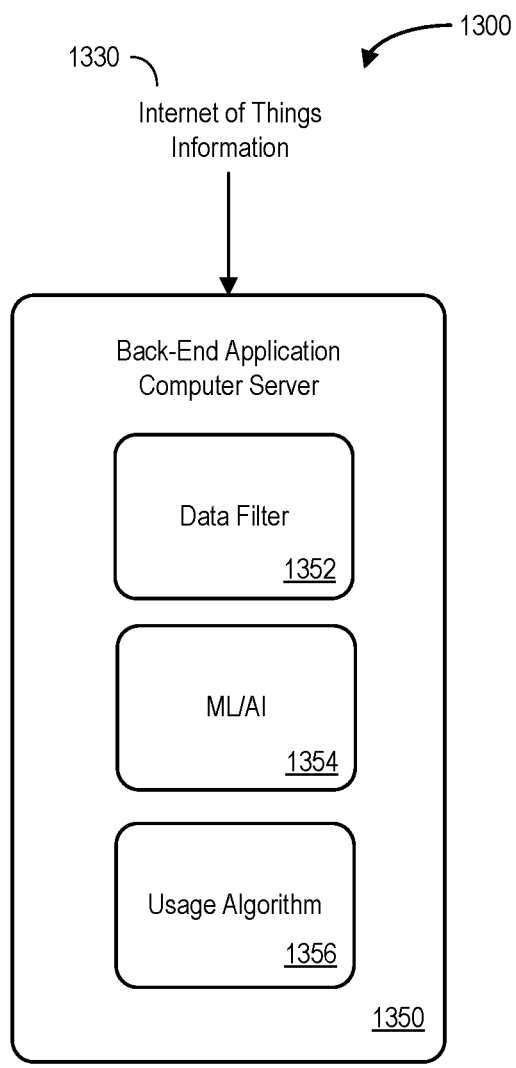
FIG. 13 is a ML/AI approach in accordance with some embodiments.

The IoT can generate a substantial amount of information which may need to be filtered and/or processed by algorithms. For example, FIG. 13 is a ML/AI approach 1300 in accordance with some embodiments. As can be seen, the approach 1300 has a back-end application computer server 1350 that receives IoT information 1330. The IoT information 1330 might pass through a data filter 1352 before being used by a Machine Learning ("ML"), Artificial Intelligence ("AI"), and/or a predictive model 1354 to create an appropriate usage algorithm 1356.

Figure 14:
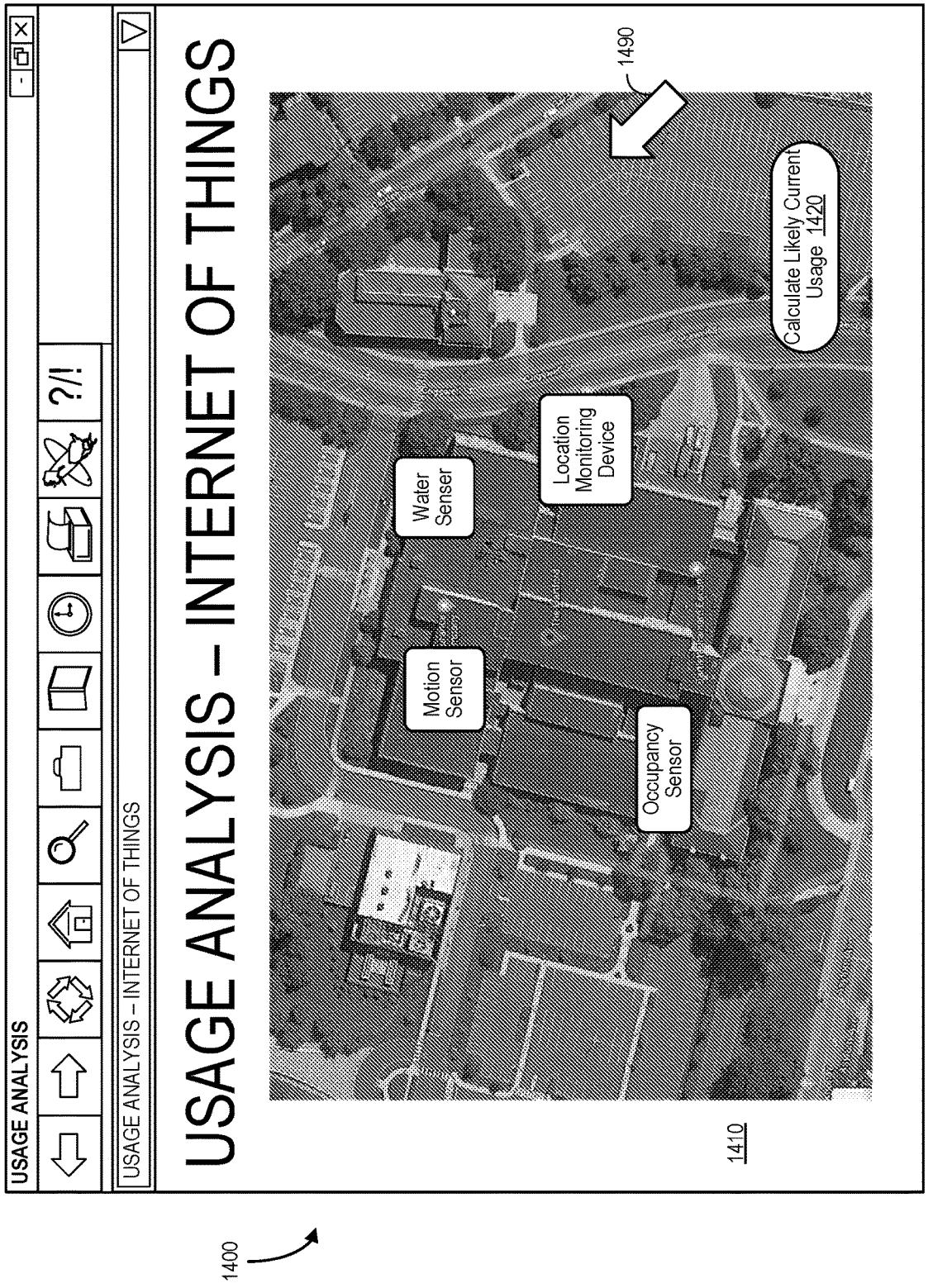
FIG. 14 is IoT display according to some embodiments.

FIG. 14 is an IoT display 1400 according to some embodiments. The display 1400 includes a satellite image 1410 of a factory showing the locations of various IoT sensors (e.g., motion sensors, location monitoring devices, etc.). The display 1400 also includes a "Calculate Likely Current Usage" icon 1420 that may be used to initiate calculation of an amount of usage. Selection of a portion or element of the display 1400 (e.g., by touchscreen or computer mouse pointer 1490) might result in the presentation of additional information about that portion or element or let an operator or administrator enter or annotate additional information about an estimated usage (e.g., based on his or her experience and expertise).

Figure 15:
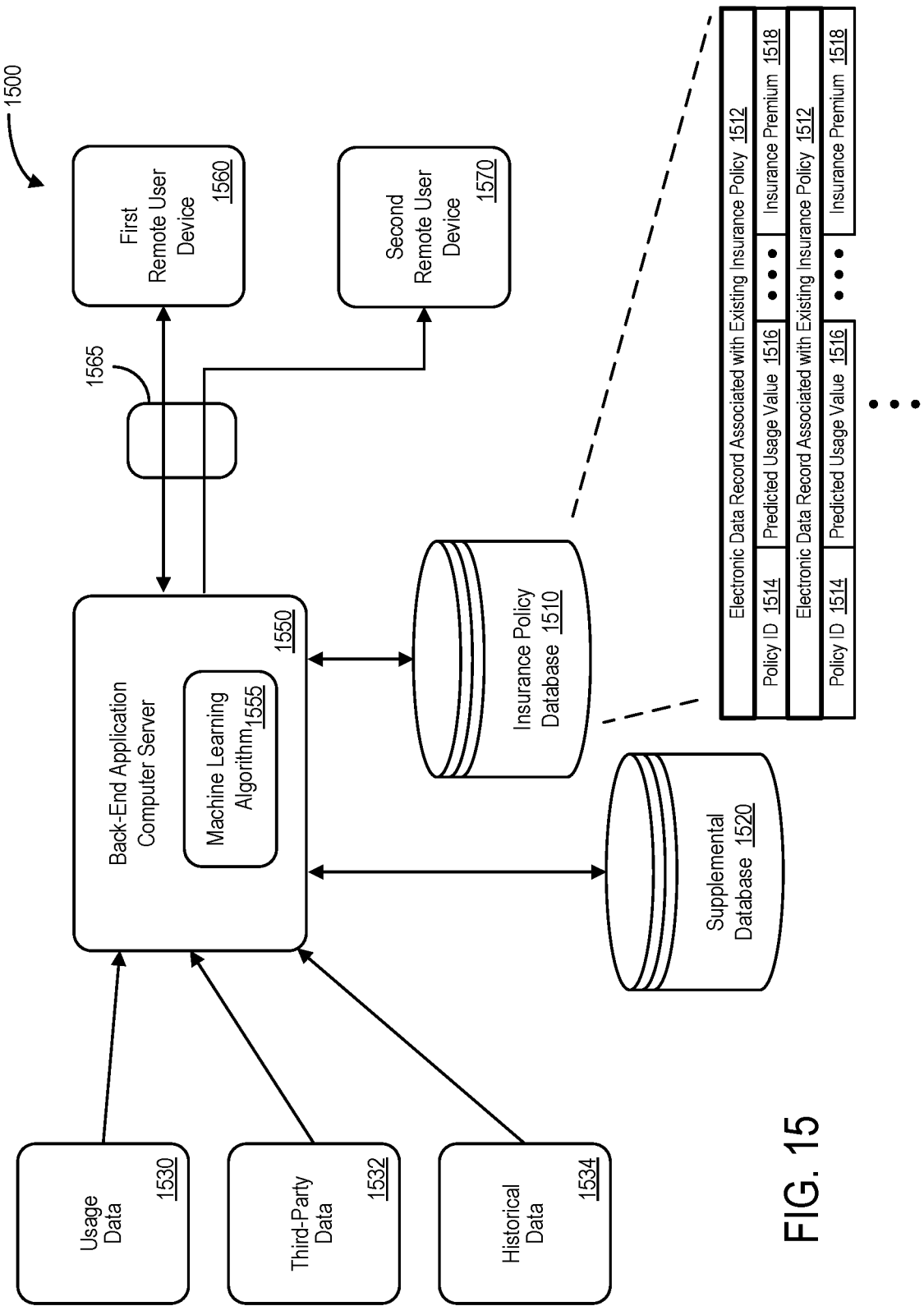
FIG. 15 is a more detailed block diagram of a system according to some embodiments.

According to some embodiments, a risk relationship provider may comprise an insurer while a risk relationship is associated with an insurance policy. The insurance policy might be associated with, for example, business insurance, general liability insurance, property insurance, professional liability insurance, business interruption insurance, business liability insurance, etc. Moreover, an adjusted risk relationship parameter might be associated with an insurance premium, a rate change, a limits change, a classification, a coverage, a deductible amount, a renewal, a new type of insurance, an endorsement, etc. For example, FIG. 15 is a more detailed block diagram of a system 1500 according to some embodiments. Here, a back-end application computer server 1550 uses a machine learning algorithm 1555 to analyze information in an insurance policy database 1510. The insurance policy database 1510 may contain, for example, electronic data records 1512 containing a policy identifier 1514, predicted usage attribute values 1516, insurance premium values 1518, etc. The machine learning algorithm 1555 may also receive information from a supplemental database 1520 (e.g., historic insurance claims associated with other estimated usages), usage data 1530, third-party data 1532, and historical data 1534. Moreover, the back-end application computer server 1550 may exchange information (e.g., via a firewall 1565) with multiple remote user devices 1560, 1570 (e.g., such as those associated with businesses, underwriters, etc.). In this way, the system 1500 may blend data from various sources to improve estimated and/or predicted usage values (and, thus, the accuracy of risk analysis).

Figure 16:
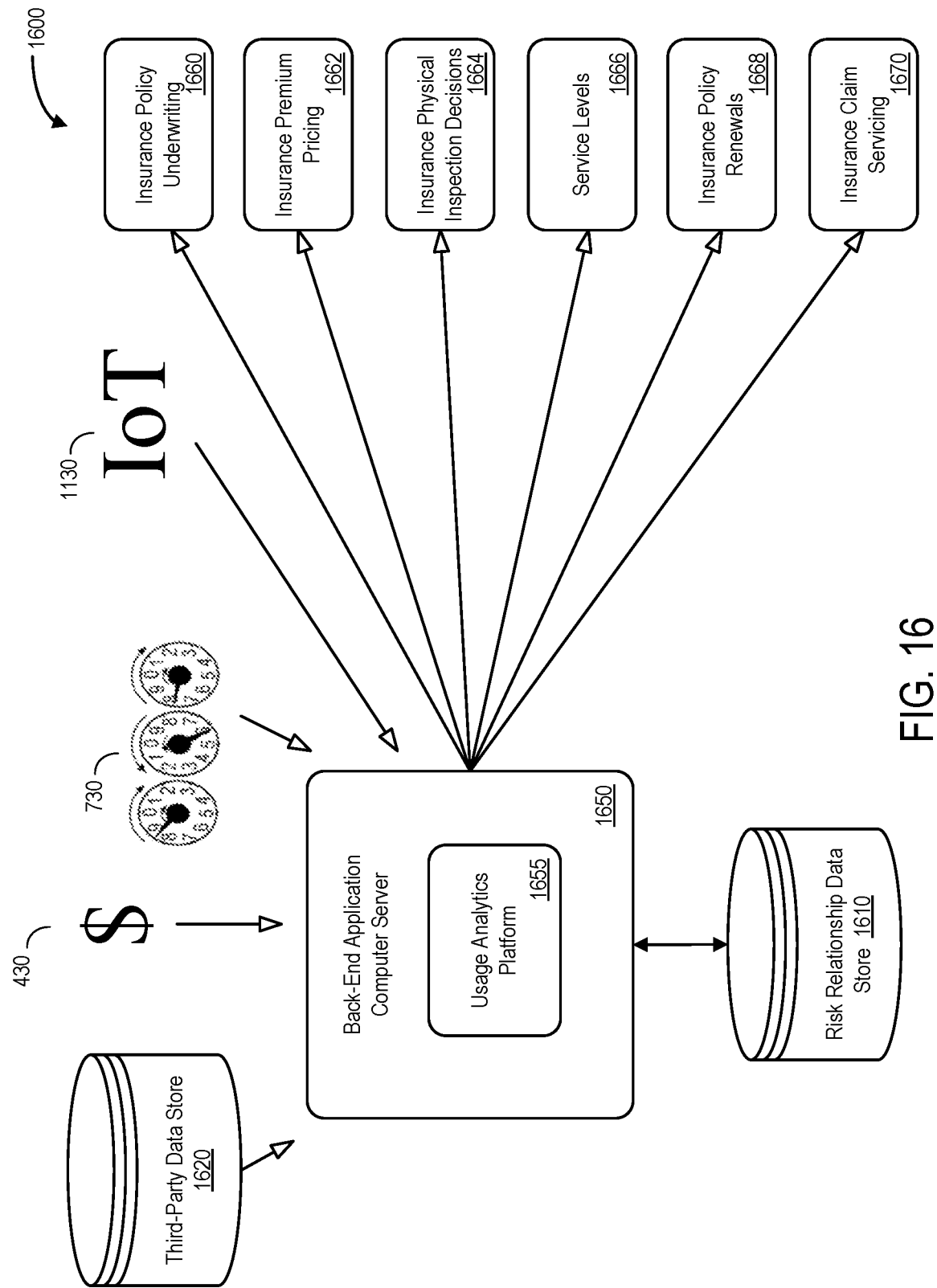
FIG. 16 is an estimated usage data analysis information flow diagram according to some embodiments.

Note that different types of information may be blended together in accordance with any of the embodiments described herein. For example, FIG. 16 is an estimated usage data analysis information flow diagram 1600 according to some embodiments. As before, a back-end application computer server 1650 exchanges information with a risk relationship data store 1610. A usage analytics platform 1655 may further receive information from a third-party data store 1620, financial information 430, public utility information 730, and IoT information 1130. The usage analytics platform 1655 may then combine all of this disparate, heterogeneous data to predict and/or monitor current usage for a business. The usage information may then be utilized in connection with insurance policy underwriting 1660, insurance premium pricing 1662, insurance physical inspection decisions 1664 (e.g., do we need to send an inspector on-site?), service levels 1666, insurance policy renewals 1668 (e.g., do we still want to insure this particular level of current usage), insurance claim servicing 1670, etc.

Figure 17:
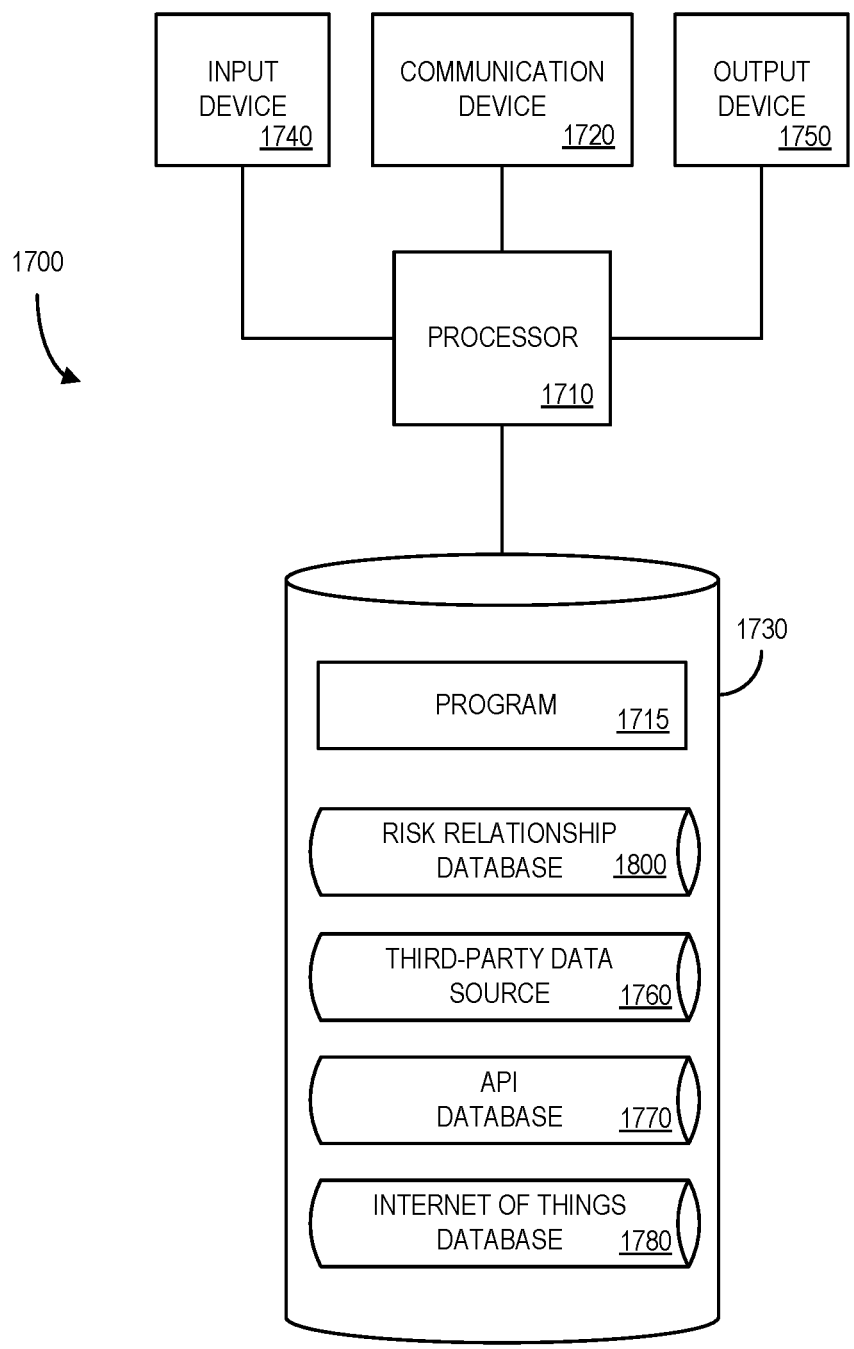
FIG. 17 is a block diagram of an apparatus in accordance with some embodiments of the present invention.

The embodiments described herein may be implemented using any number of different hardware configurations. For example, FIG. 17 illustrates an apparatus 1700 that may be, for example, associated with the systems 100, 1500 described with respect to FIGS. 1 and 15, respectively. The apparatus 1700 comprises a processor 1710, such as one or more commercially available Central Processing Units ("CPUs") in the form of one-chip microprocessors, coupled to a communication device 1720 configured to communicate via a communication network (not shown in FIG. 17). The communication device 1720 may be used to communicate, for example, with one or more remote third-party estimated usage information suppliers, administrator computers, and or communication devices (e.g., PCs and smartphones). Note that communications exchanged via the communication device 1720 may utilize security features, such as those between a public internet user and an internal network of an insurance company and/or an enterprise. The security features might be associated with, for example, web servers, firewalls, and/or PCI infrastructure. The apparatus 1700 further includes an input device 1740 (e.g., a mouse and/or keyboard to enter information about estimated usages, measured current values, third-parties, etc.) and an output device 1750 (e.g., to output reports regarding estimated usage risk factors, recommended changes, etc.).

The processor 1710 also communicates with a storage device 1730. The storage device 1730 may comprise any appropriate information storage device, including combinations of magnetic storage devices (e.g., a hard disk drive), optical storage devices, mobile telephones, and/or semiconductor memory devices. The storage device 1730 stores a program 1715 and/or an estimated usage risk evaluation tool or application for controlling the processor 1710. The processor 1710 performs instructions of the program 1715, and thereby operates in accordance with any of the embodiments described herein. For example, the processor 1710 may receive, from a current usage data source, current usage information for the enterprise (e.g., financial information, utility information, IoT information, etc.). Based on the current usage information, the processor 1710 may infer a likely actual current usage for the enterprise. The processor 1710 may then compare the likely actual current usage with the predicted usage attribute value to determine a risk difference result and adjust a risk relationship parameter based on the risk difference result.

The program 1715 may be stored in a compressed, uncompiled and/or encrypted format. The program 1715 may furthermore include other program elements, such as an operating system, a database management system, and/or device drivers used by the processor 1710 to interface with peripheral devices.

As used herein, information may be "received" by or "transmitted" to, for example: (i) the back-end application computer server 1700 from another device; or (ii) a software application or module within the back-end application computer server 1700 from another software application, module, or any other source.

In some embodiments (such as shown in FIG. 17), the storage device 1730 further stores a risk relationship database 1800, a third-party data source 1760 (e.g., associated with someone other than the insured and the insurer), an API database 1770 (e.g., storing public API information for financial information etc.), and an IoT database 1780. An example of a database that might be used in connection with the apparatus 1700 will now be described in detail with respect to FIG. 18. Note that the database described herein is only an example, and additional and/or different information may be stored therein. Moreover, various databases might be split or combined in accordance with any of the embodiments described herein. For example, the risk relationship database 1800 and third-party data source 1760 might be combined and/or linked to each other within the program 1715.

Figure 18:
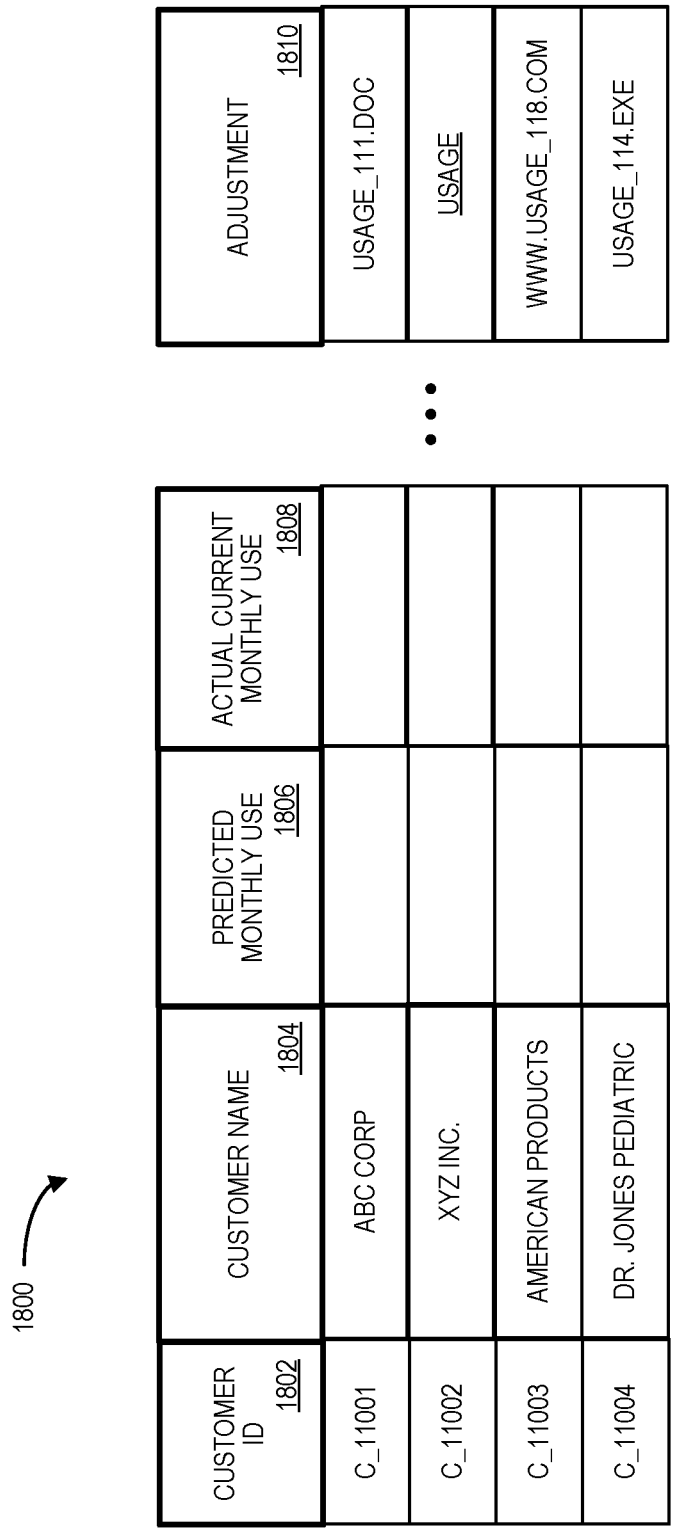
FIG. 18 is a portion of a tabular risk relationship database according to some embodiments.

Referring to FIG. 18, a table is shown that represents the risk relationship database 1800 that may be stored at the apparatus 1800 according to some embodiments. The table may include, for example, entries associated with insurance policies that have been sold to an enterprise. The table may also define fields 1802, 1804, 1806, 1808, 1810 for each of the entries. The fields 1802, 1804, 1806, 1808, 1810 may, according to some embodiments, specify: a customer identifier 1802, a customer name 1804, predicted monthly use 1806, an actual current monthly use 1808, and an adjustment 1810. The risk relationship database 1800 may be created and updated, for example, based on information electrically received from various computer systems, including those associated with a third-party.

The customer identifier 1802 may be, for example, a unique alphanumeric code identifying a customer who has purchased an insurance policy. The customer name 1804 may be associated with the insured, and the predicted monthly usage 1806 might indicate how much of a product, service, etc. the customer is expected to use, consume, produce, etc. The actual current monthly usage 1808 might indicate how much of that product or service is being used by the customer. The predicted monthly use 1806 and actual current monthly use 1808 (and similar information) may then be used to determine an appropriate adjustment 1810 (e.g., an appropriate premium value, endorsement, change to coverage limits, etc.).

Thus, embodiments may provide systems and methods to automatically estimate and/or measure usage information in a way that provides fast and accurate results. Embodiments may also provide an ability to access and interpret data in a holistic, tactical fashion. According to some embodiments, the system may be agnostic regarding particular web browsers, sources of information, etc. For example, information from multiple sources (e.g., an internal insurance policy database and an external data store) might be blended and combined (with respect to reading and/or writing operations) so as to appear as a single "pool" of information to a user at a remote device. Moreover, embodiments may be implemented with a modular, flexible approach such that deployment of a new system for an enterprise might be possible relatively quickly.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 19:
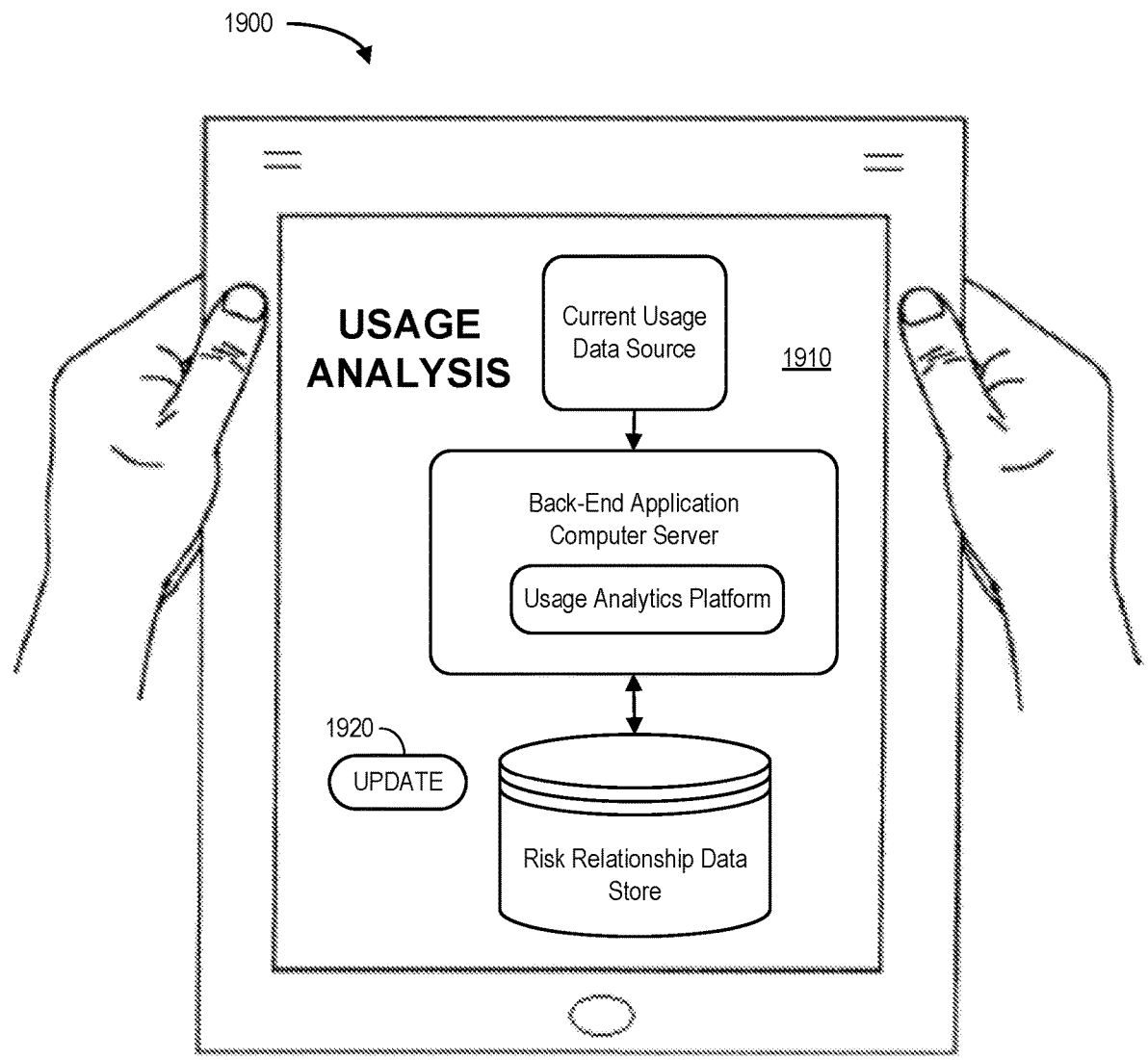
FIG. 19 illustrates a tablet computer displaying an estimated usage risk estimation user interface according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies, embodiments may instead be associated with other types of insurance policies in addition to and/or instead of the policies described herein (e.g., business insurance policies). Similarly, although certain attributes were described in connection some embodiments herein, other types of attributes might be used instead. Still further, the displays and devices illustrated herein are only provided as examples, and embodiments may be associated with any other types of user interfaces. For example, FIG. 19 illustrates a handheld tablet computer 1900 showing usage analysis display 1910 according to some embodiments. The usage analysis display 1910 might include user-selectable data that can be selected and/or modified by a user of the handheld computer 1900 (e.g., via an "Update" icon 1920) to view updated insurance information associated with an enterprise (e.g., including, in some embodiments, estimated and current levels of use).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed:

1. An estimated usage risk relationship management system implemented via a back-end application computer server, comprising:
    (a) a risk relationship data store that contains electronic records, each electronic record representing a risk relationship between an enterprise and a risk relationship provider, and including, for each risk relationship, an electronic record identifier and a predicted usage attribute value;
    (b) a current usage data source associated with the enterprise;
    (c) the back-end application computer server, coupled to the risk relationship data store and the current usage data source, including:
        a computer processor, and
        a computer memory, coupled to the computer processor, storing instructions that, when executed by the computer processor, cause the back-end application computer server to:
            (i) receive, from the current usage data source, current Internet of Things (IoT) information for the enterprise for a resource,
            (ii) receive third-party data and historical data for the resource;
            (iii) based on the current IoT information for the resource, the received third-party data for the resource and the received historical data for the resource, infer, via a trained machine learning model, a likely actual current usage for the enterprise for the resource;
            (iv) compare the likely actual current usage with the predicted usage attribute value to determine a risk difference result;

(v) automatically adjust a risk relationship parameter based on the risk difference result and a fluctuation sensitivity level;
(vi) re-train the trained machine learning model in response to receipt of the adjusted risk relationship parameter; and
(d) a communication port coupled to the back-end application computer server to facilitate a transmission of data to a remote device to support an interactive display, including an indication of the adjusted risk relationship parameter, via a distributed communication network.

2. The system of claim 1, wherein the current usage data source is associated with at least one of: (i) financial software, (ii) accounting software, (iii) tax management software, (iv) a point of sale system, and (v) an order management system.

3. The system of claim 1, wherein the current usage data source is associated with an Application Programing Interface ("API").

4. The system of claim 1, wherein the current usage data source is associated with at least one of: (i) a public utility, (ii) an electric utility, (iii) a water utility, (iv) a transportation service, and (v) a disposal service.

5. The system of claim 4, wherein the IoT information is associated with at least one of: (i) an amount of electric power, and (ii) an amount of water.

6. The system of claim 5, wherein the current usage data source is associated with at least one of: (i) a physical sensor, and (ii) a usage meter.

7. The system of claim 1, wherein the current usage data source is associated with at least one of: (i) occupancy sensors, (ii) proximity sensors, (iii) a smart security system, (iv) inventory tracking sensors, and (v) movement sensors.

8. The system of claim 7, wherein the current usage data source is associated with an Internet of Things ("IoT").

9. The system of claim 1, wherein the risk relationship provider comprises an insurer and the risk relationship is associated with an insurance policy.

10. The system of claim 9, wherein the insurance policy is associated with at least one of: (i) business insurance, (ii) general liability insurance, (iii) property insurance, (iv) professional liability insurance, (v) business interruption insurance, and (vi) business liability insurance.

11. The system of claim 10, wherein the adjusted risk relationship parameter is associated with at least one of: (i) an insurance premium, (ii) a rate change, (iii) a limits change, (iv) a classification, (v) a coverage, (vi) a deductible amount, (vii) a renewal, (viii) a new type of insurance, and (ix) an endorsement.

12. The system of claim 1, wherein the back-end application computer server is associated with at least one of: (i) Machine Learning ("ML"), (ii) Artificial Intelligence ("AI"), and (iii) a predictive model.

13. A computerized estimated usage risk relationship management method implemented via a back-end application computer server, comprising:
  accessing, by the back-end application computer server, a risk relationship data store that contains electronic records, each electronic record representing a risk relationship between an enterprise and a risk relationship provider, and including, for each risk relationship, an electronic record identifier and a predicted usage attribute value;
  receiving, from a current usage data source, current Internet of Things (IoT) information for the enterprise for a resource;
  receive third-party data and historical data for the resource,
  based on the current IoT information for the resource, the received third-party data for the resource and the received historical data for the resource, inferring, via a trained machine learning model, a likely actual current usage for the enterprise for the resource;
  comparing the likely actual current usage with the predicted usage attribute value to determine a risk difference result;
  automatically adjusting a risk relationship parameter based on the risk difference result and a fluctuation sensitivity level;
  re-training the trained machine learning model in response to receipt of the adjusted risk relationship parameter;
  and
  arranging to provide an interactive display, including an indication of the adjusted risk relationship parameter, via a distributed communication network.

14. The method of claim 13, wherein the current usage data source is associated with at least one of: (i) financial software, (ii) accounting software, (iii) tax management software, (iv) a point of sale system, or (v) an order management system.

15. The method of claim 13, wherein the current usage data source is associated with at least one of: (i) a public utility, (ii) an electric utility, (iii) a water utility, (iv) a transportation service, and (v) a disposal service.

16. The method of claim 15, wherein the current usage data source is associated with at least one of: (i) occupancy sensors, (ii) proximity sensors, (iii) a smart security system, (iv) inventory tracking sensors, and (v) movement sensors.

17. A non-transitory, computer-readable medium storing instructions, that, when executed by a processor, cause the processor to perform an estimated usage risk relationship management method implemented via a back-end application computer server, the method comprising:
  accessing, by the back-end application computer server, a risk relationship data store that contains electronic records, each electronic record representing a risk relationship between an enterprise and a risk relationship provider, and including, for each risk relationship, an electronic record identifier and a predicted usage attribute value;
  receiving, from a current usage data source, current IoT information for the enterprise for a resource;
  receiving third-party data and historical data for the resource;
  based on the current IoT information for the resource, the received third-party data for the resource and the received historical data for the resource, inferring, via a trained machine learning model, a likely actual current usage for the resource;
  comparing the likely actual current usage with the predicted usage attribute value to determine a risk difference result;
  automatically adjusting a risk relationship parameter based on the risk difference result and a fluctuation sensitivity level;
  re-training the trained machine learning model in response to receipt of the adjusted risk relationship parameter;
  and
  arranging to provide an interactive display, including an indication of the adjusted risk relationship parameter, via a distributed communication network.

18. The medium of claim 17, wherein the risk relationship provider comprises an insurer and the risk relationship is associated with an insurance policy.

19. The medium of claim 18, wherein the insurance policy is associated with at least one of: (i) business insurance, (ii) general liability insurance, (iii) property insurance, (iv) professional liability insurance, (v) business interruption insurance, and (vi) business liability insurance.

20. The medium of claim 19, wherein the adjusted risk relationship parameter is associated with at least one of: (i) an insurance premium, (ii) a rate change, (iii) a limits change, (iv) a classification, (v) a coverage, (vi) a deductible amount, (vii) a renewal, (viii) a new type of insurance, and (ix) an endorsement.

* * * * *